United States Patent
Fox et al.

(10) Patent No.: US 8,543,112 B2
(45) Date of Patent: Sep. 24, 2013

(54) IMPLEMENTATION OF TELECOMMUNICATIONS NETWORK ACCESS RESTRICTIONS

(75) Inventors: David Fox, Reading (GB); Gavin Wong, Surrey (GB); John Mahony Watson, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 380 days.

(21) Appl. No.: 12/449,462

(22) PCT Filed: Feb. 11, 2008

(86) PCT No.: PCT/GB2008/000472
§ 371 (c)(1),
(2), (4) Date: Apr. 1, 2010

(87) PCT Pub. No.: WO2008/096162
PCT Pub. Date: Aug. 14, 2008

(65) Prior Publication Data
US 2010/0197294 A1    Aug. 5, 2010

(30) Foreign Application Priority Data
Feb. 9, 2007  (GB) .................................... 0702558.8

(51) Int. Cl.
*H04W 4/00*   (2009.01)
(52) U.S. Cl.
USPC ......... 455/435.3; 455/434; 455/453; 455/458
(58) Field of Classification Search
USPC ................ 455/422.1, 435.2, 435.3, 453, 458, 455/434
See application file for complete search history.

(56) References Cited

U.S. PATENT DOCUMENTS

| | | | |
|---|---|---|---|
| 5,490,087 A | 2/1996 | Redden et al. | |
| 5,666,356 A | 9/1997 | Fleming et al. | |
| 5,937,355 A | 8/1999 | Joong et al. | |
| 6,192,248 B1 | 2/2001 | Solondz | |
| 6,275,695 B1* | 8/2001 | Obhan | 455/423 |
| 6,484,145 B1* | 11/2002 | Home et al. | 705/7.25 |
| 7,050,445 B1* | 5/2006 | Zellner et al. | 370/412 |
| 7,933,249 B2* | 4/2011 | Amalfitano | 370/335 |
| 2002/0183039 A1 | 12/2002 | Padgett et al. | |
| 2005/0271048 A1 | 12/2005 | Casey | |
| 2006/0072522 A1* | 4/2006 | Chandra et al. | 370/338 |
| 2007/0043558 A1 | 2/2007 | Schwarz et al. | |

FOREIGN PATENT DOCUMENTS

| | | |
|---|---|---|
| EP | 1071303 A2 | 1/2001 |
| EP | 1077580 A1 | 2/2001 |
| EP | 1087633 A1 | 3/2001 |
| EP | 1318689 A2 | 6/2003 |

(Continued)

*Primary Examiner* — Temica M Beamer
(74) *Attorney, Agent, or Firm* — Muirhead and Saturnelli, LLC (57) ABSTRACT

A system and method for restricting public access to a mobile telecommunications network in order to prevent congestion. The system and method are particularly useful in situations where the number of end users exceeds, or is likely to exceed, network capacity, for example in emergency situations or for large public gatherings, such as sporting events or New Years Eve celebrations. The system and method disclosed uses filtering by network elements, such as the base stations and MSCs. In particular the system and method can filter low data messages, such as SMS, from more demanding services, such as voice calls, so that all low data messages are transmitted, while the more demanding services are terminated, unless special conditions are met.

19 Claims, 3 Drawing Sheets

(56) References Cited

FOREIGN PATENT DOCUMENTS

| | | |
|---|---|---|
| GB | 2424343 | 9/2006 |
| GB | 2443233 | 4/2008 |
| JP | 2006005412 | 1/2006 |
| WO | WO99/23842 | 5/1999 |
| WO | WO00/01189 | 1/2000 |
| WO | WO2006113055 | 10/2006 |

* cited by examiner

IMPLEMENTATION OF TELECOMMUNICATIONS NETWORK ACCESS RESTRICTIONS

TECHNICAL FIELD

This application relates to a system and method for implementing access restrictions in a telecommunications network. More particularly, but not exclusively, this application relates to a method of implementing access restrictions in a GSM/UMTS/LTE telecommunications network when the number of end users exceeds network capacity, such as in an emergency situation.

BACKGROUND

Currently in situations where the number of end users exceeds network capacity, which may occur in emergency situations or for large public gatherings, such as sporting events or New Years Eve celebrations, the telecommunications network can quickly become congested. To allow high priority users, such as the emergency services, to get through, "Access Class Barring" is typically utilised. Access Class Barring is used to restrict public usage of the telecommunication resources.

To implement Access Class Barring, all mobile devices have an access class, which is a numerical identifier associated with the mobile terminal's SIM card. The SIMs used by high priority users each have an access class of between 11 and 15, and the SIMs used by the public are allocated an access class of between 0 and 9. The status of an additional Access Class 10, common to all access classes, determines whether or not a particular mobile terminal (with or without a SIM card being present) may make an emergency call. The status is signalled over the air to the mobile terminal by the home or visited Public Land Mobile Network (PLMN). In the time of an emergency, access to the base stations in the problematic geographic region will be restricted by barring a number of classes of mobile terminals from using the network within that geographic region. This restriction could range from a full exclusion of the public, to only one or two public priority classes.

As the emergency services do not usually require all the network resources to be dedicated to them, it is typical that only a subset of the public classes are excluded from network access in the problematic cells at any one time. This is achieved by periodically cycling through all the public classes, for instance, classes 0 to 2 may be allowed network access for a period of time, and then classes 3 to 5 for a subsequent period of time and so on. It is important for the general public to have some ability to communicate in emergency situations, particularly since the inability to communicate can lead to greater levels of stress and panic, both on an individual basis and at a crowd level.

In practice, each cell broadcasts a list of access class groups which are allowed to access the cell. At the initiation end, the terminal of the initiating party will check on the SIM for the access class groups which the subscriber belongs, If the subscriber does not belong to one of the access class groups which is currently allowed on the cell at that time the terminal informs the subscriber that the call set up request is denied and no communication is established between the terminal and the BTS.

At the terminating end, when an incoming communication is received for a subscriber in a congested and restricted cell, the terminating subscriber is paged and the terminal of that terminating subscriber will check on the SIM for the access class which the subscriber belongs. If the subscriber does not belong to one of the access class groups which is currently allowed on the cell at that time the terminal will not respond to the paging message. The network may attempt to page a couple of times, before informing the party initiating the call that the called subscriber is not reachable.

Access Class Barring is not an ideal solution for providing public access to the communication channels in the time of an emergency, particularly if the called party is in a restricted cell, as it is only the classes with access at any given time that are able to make and receive calls. The decision of whether to allow a communication is made based on whether each subscriber is permitted access to its local cell, regardless of the other party involved in the communication. If either subscriber is restricted by their local cells at the time of the communication set up request, the communication set up is prevented. In other words, for a subscriber-to-subscriber communication to be established, and both parties are within a restricted cell, then both parties need to be of the classes that are allowed to access the network. For example, considering the situation of classes 1, 5 and 9 only being given network access in a restricted cell, if a person with a mobile terminal in class 1 wishes to call a person with a mobile terminal in class 8, and both terminals are within the restricted cell, then while the class 1 terminal will be able to initiate the call, the class 8 terminal will not respond to the call, as that terminal does not currently have network access. Overall, if half of all public terminals have been barred access to the network in a restricted access area, then the probability of two users being able to successfully establish a communication, when both terminals are within the restricted area, is only one in four (i.e. only a 25% success rate).

It is also to be appreciated that another problem of Access Class Barring is that when a communication cannot be established, it results in wasted signalling resources, as a terminal excluded from network access in a restricted cell will not respond to the incoming call, despite the effort that has gone into tracking the terminal down. This needless paging can also create further unnecessary congestion in the restricted cell. Additionally this process wastes traffic resources on the cell at the initiating end, as the network allocates a traffic channel to this subscriber whilst the network tries to contact the terminating party.

SUMMARY OF THE INVENTION

According to the system described herein, a method of restricting the establishment of communications in a mobile telecommunications network includes: at least one network element, upon receiving a communication setup message, deciding whether to transmit the service request message based upon at least one network condition.

The at least one network condition may include: a type of service requested; a current load capacity of a base station; a priority level of a first mobile terminal device initiating a service request message; a priority level of an intended recipient of the communication setup message, where the intended recipient is a second mobile terminal device; and a paging area characteristic of the paging area of the second mobile terminal device.

According further to the system described herein, a method of restricting the establishment of communications in a mobile telecommunications network includes: at least one network element, upon receiving a communication setup message or paging message, deciding whether to transmit the communication setup message or paging message based upon a predetermined rule set, such that the message will be transmitted where: the message is received from a high priority user; the message is received for a high priority user; or the message is a request for a low data rate service, such as an SMS.

According further to the system described herein, in a mobile telecommunication network including a plurality of mobile terminals having a priority indication, a network element may be configured for use in restricting the establishment of communications with the plurality of mobile terminals, the network element including: an access mode component configured to operate in a restricted access mode upon receiving an instruction to do so; a filtering component configured to use a rule set to determine whether to action any communication request received when operating in the restricted mode, such that the restricted mode rule set: actions all communication requests received from or for high priority users; and actions all low data rate requests.

Advantageously, by implementing a network filtering procedure as per the system described herein when a restricted network access mode has been implemented, a more optimal use of signalling resources can be achieved. The filtering may be performed by any network element, but generally, the earlier the element performing the filtering appears in the network hierarchy, the better.

The communication setup message may be a service request message transmitted by the mobile terminal seeking to initiate the communication, or a paging message generated from within in the network in response to the service request message.

DETAILED DESCRIPTION OF VARIOUS EMBODIMENTS

Certain elements of a mobile telecommunications network, and its operation, will now briefly be described with reference to FIG. 1.

Each base station (BS) serves a respective cell of its cellular or mobile telecommunications network and receives calls from and transmits calls to a mobile terminal in that cell by wireless radio communication in one or both of the circuit switched or packet switched domains. Such a subscriber's mobile terminal (UE) is shown at 1. The mobile terminal may be any mobile communications device, such as a handheld mobile telephone, a personal digital assistance (PDA) or a laptop computer equipped with a datacard.

In a GSM mobile telecommunications network, each base station includes a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

In the proposed LTE mobile telecommunications network, each base station comprises an eNode B which essentially combines much of the UMTS Node B and RNC functionality into a single entity. The base stations are arranged in groups and each group of base stations is controlled by a Mobility Management Entity (MME) and a User Plane Entity (UPE).

Conventionally, in a GSM/UNITS network, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1. The base stations 3, 4, 5, 7, 8 and 9 each have dedicated (not shared) connection to their applicable MSC (2 or 6)—typically being a cable connection. This prevents transmission speeds being reduced due to congestion caused by other traffic.

The MSCs 2 and 6 support communications in the circuit switched domain—typically voice calls. Corresponding Serving GPRS Support Nodes (SGSNs) 16 and 18 are provided to support communications in the packet switched domain—such as GPRS data transmissions. The SGSNs 16 and 18 function in an analogous way to the MSCs 2 and 6. For the sake of simplicity, all future references to an MSC are also to be taken as equivalently covering an SGSN or an MME.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) and a priority class number between 0 and 15, where numbers 0 to 9 are allocated to SIMs for use by members of the public, and numbers 11 to 15 reserved for SIMs intended for special uses, such as for use by the emergency services. The status of an additional Access Class 10, common to all priority classes, determines whether or not a particular mobile terminal (with or without a SIM card being present) may make an emergency call. The status is signalled over the air to the mobile terminal by the home or visited PLMN. Neither of the IMSI or the access class number is visible on the SIM card, nor does the subscriber know them. The subscriber is issued with a publicly known number, that is, the subscriber's telephone number, by means of which callers initiate calls to the subscriber. This number is the Mobile Systems International Subscriber Identity Number (MSISDN).

The network includes a home location register (HLR) 10 which, for each subscriber to the network, stores the IMSI and the corresponding MSISDN together with other subscriber data, such as the current or last known location of the subscriber's mobile terminal. This information is used when paging a mobile terminal.

Paging is a process of broadcasting a message, which alerts a specific mobile terminal to take some action—for example, to notify the terminal that there is an incoming call to be received. If the network knows in which cell the mobile terminal is located, it may only be necessary to page in that cell. However, if the mobile terminal is moving within the network, the precise cell in which the mobile terminal is located may not be known. It may therefore be necessary to perform paging in a number of cells.

Filtering at BTS Serving the Initiating Subscriber

A first embodiment of the invention will now be described in relation to the identification of a situation where network congestion has occurred, or is likely to occur, in the cell within which a subscriber is attempting to initiate a communication. In this embodiment the core network sends an instruction to network elements involved in the paging process in the congested area, such as the base stations/Node Bs and MSCs/MMEs, in order to implement a predefined "restricted access" mode. In "restricted access" mode, each network element involved has a set of rules that it must use to decide whether or not to forward a call setup/paging message in order to allow a communication attempt to proceed, whilst also providing full network access to the emergency services and subscribers with allowed access classes.

Figure 1:
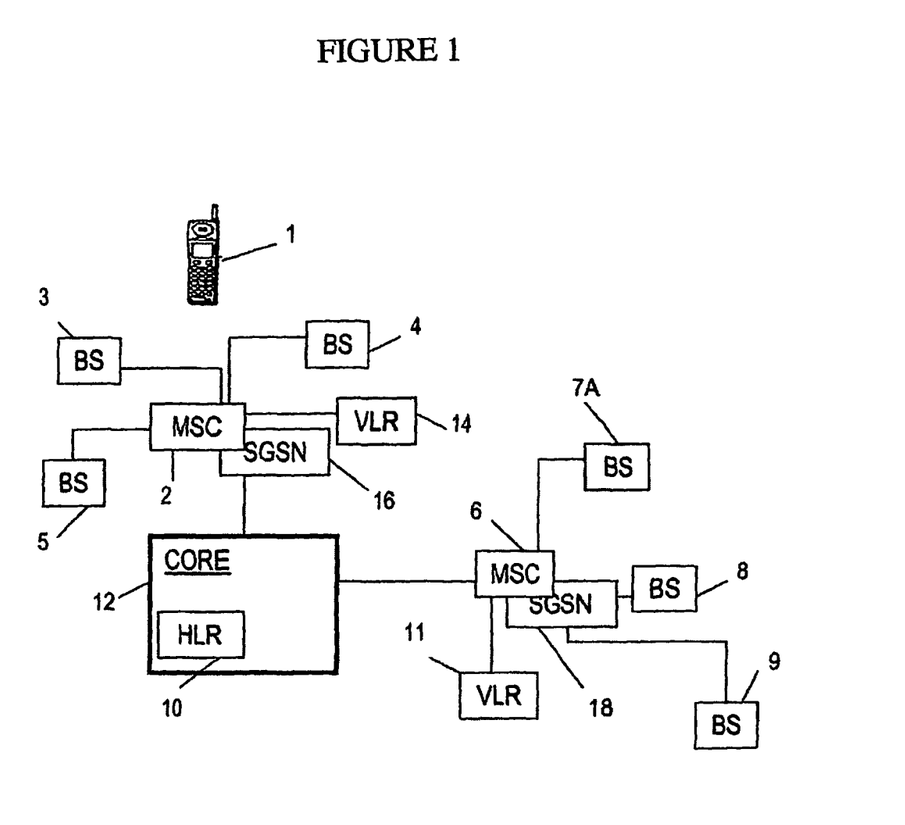
FIG. 1 is a diagrammatic drawing of certain elements of a mobile telecommunications network for use in explaining the operation of such a network, as well as embodiments of the system described herein.

With reference to FIG. 1, to illustrate this embodiment of the invention, MSC 2 and base stations 3 and 4 are within the problematic and congested area and are operating in the restricted access mode. In this regard, with network access restrictions in place, the behaviour of these base stations and/or MSCs in the restricted area is modified.

When a subscriber 1 in the restricted area wishes to initiate a call or send a message to another party, they will enter the number to be called, the message (for a data service) and press "send" or "call", as applicable. The mobile terminal 1 will then transmit a data/call setup service request to the serving base station/Node B, which in this embodiment is BS 3 operating in "restricted access" mode. The setup service request will include the access class of the initiating subscriber.

The base station 3 will assess the data/call setup service request received from the mobile terminal 1 in order to determine if it should forward the request for further processing by the network. For example, with reference to FIG. 2A, the base station 3 will check the class of the initiating terminal/subscriber 1 sending the message (step 20) by confirming the access class information contained within the service setup request. If the initiating mobile terminal 1 has a class of between 11 and 15 (i.e. belonging to a high priority class), then the paging request will be immediately sent on to the MSC 2 (step 21).

Figure 2A:
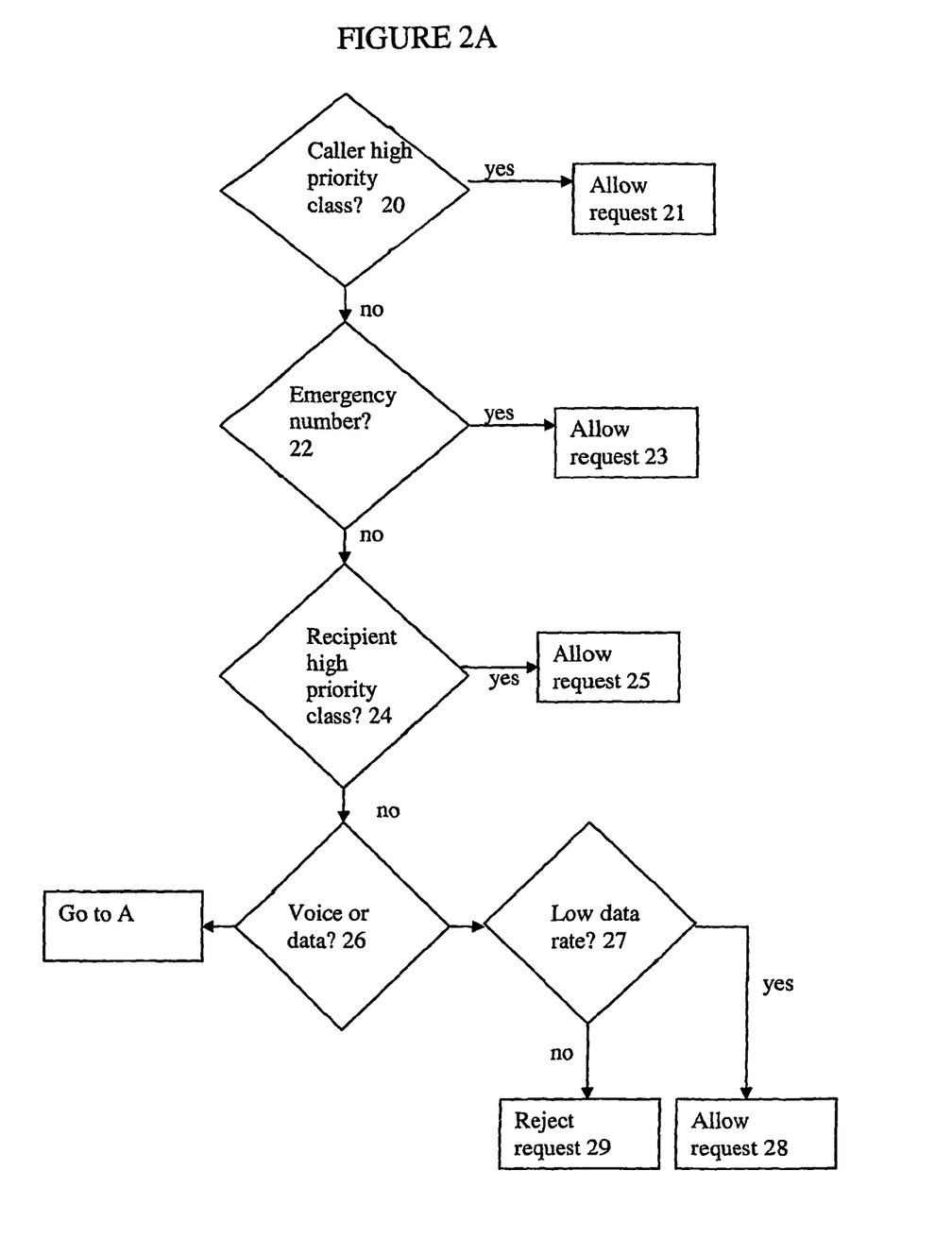
FIGS. 2A and 2B provide flow charts illustrating the implementation of an embodiment of the system described herein.

If the cell is congested and is in a restricted state, the BTS will compare the access class of the initiating subscriber with those permitted by the BTS at that time. If the class of the initiating subscriber is permitted by the BTS at that time then the BTS will allocate resource to that subscriber and proceed with the call set up. However, if the initiating subscriber belongs to a class which is currently restricted, then the base station 3 may determine whether to forward the request based on who the mobile terminal 1 is calling. For instance, if the mobile terminal 1 is attempting to call a special emergency services number, such as 112 or 911 (step 22), and access Class 10 is permitted, then the base station 3 can decide to forward the request (step 23). Similarly, if the terminal is calling a subscriber having access Class 11-15 (step 24) then the base station can also decide to forward the request (step 25).

For the base station to be able to identify that the party being called belongs to a higher, or allowed, access class, it will be necessary for the base station to be provided with information identifying the access class of the terminating subscriber. This could be determined by providing a database listing the MSIDSNs associated with high priority users, which is directly accessible by each of the base stations in a given area. Alternatively, the base station may request confirmation of the access class of a called party from the MSC/core network. If the access class of terminating subscriber is permitted by the cell serving the initiating subscriber, the communication may be allowed.

Further filtering may be provided based on the type of communication which the subscriber is attempting to initiate. For example, if the party being called is a normal member of the public with a low and restricted access class, the base station 3 may determine the type of communication requested, for example, whether the service request is intended to establish a voice communication or relates, to data (step 26). If the service request relates to a low data rate service (step 27), such as the transmission of an SMS, in view of the low data rate required for this message, the base station 3 can decide to forward the message (step 28), regardless of who is sending or receiving the message.

In contrast, if the data requested relates to a higher data rate service, such as the download of an internet site or a voice communication, the base station 3 can decide to reject the service request (step 29), in view of the restricted access mode in which it is operating. However, in certain embodiment of the invention access to certain internet sites may be allowed at this point, such as an emergency information webpage, in order to allow mobile terminals to download emergency information. The base station would preferably have access to a list of one or more allowable pages to effect this feature.

If the service request is for a voice communication, however, the base station 3 may implement additional filtering steps. For example, the base station 3 will check its own current cell capacity, and determine if its capacity is sufficient to be able to sustain the communication (step 30), without adversely affecting the high priority users' ability to utilise the cell. To implement this, the "restricted access" mode may provide the base station 3 with a cell capacity threshold for low priority users. If the base station's cell is currently operating below the threshold, then the base station can decide to forward the paging request to the MSC 2, with a view to establishing the voice communication, regardless of the identity of the sender or the recipient. If, however, the base station's cell is operating at or above the threshold, it can reject the service request (step 31). For instance, the base station 3 will reject the service request where all of its resources available for public usage are already in use. Where this occurs, the attempt to establish a communication has been terminated with a minimal use of network resources, as the decision to reject the service request has occurred within the initial base station 3.

Filtering at a MSC

The above embodiment describes the way in which the base station serving an initiating subscriber might filter communication set up requests based on its restricted access condition, the access class of the initiating subscriber, the priority class of the terminating subscriber and the type of communication. Alternatively, or additionally, embodiments of the invention may facilitate filtering to occur at the MSC. Such embodiments either remove any resource allocation decisions from the BTS or provide additional filtering opportunities.

Where the initial base station 3 allows the service request, the request will be forwarded onto the appropriate MSC/SGSN 2. Before the MSC/SGSN 2 performs its usual functions to establish a communication, such as authenticating the identity of the terminal 1, the MSC/SGSN may perform its own checks in order to determine whether it should terminate the service request or continue to process it. Preferably there is no overlap in the checks performed by the MSC, as compared with the checks previously performed by the base station.

Figure 2B:
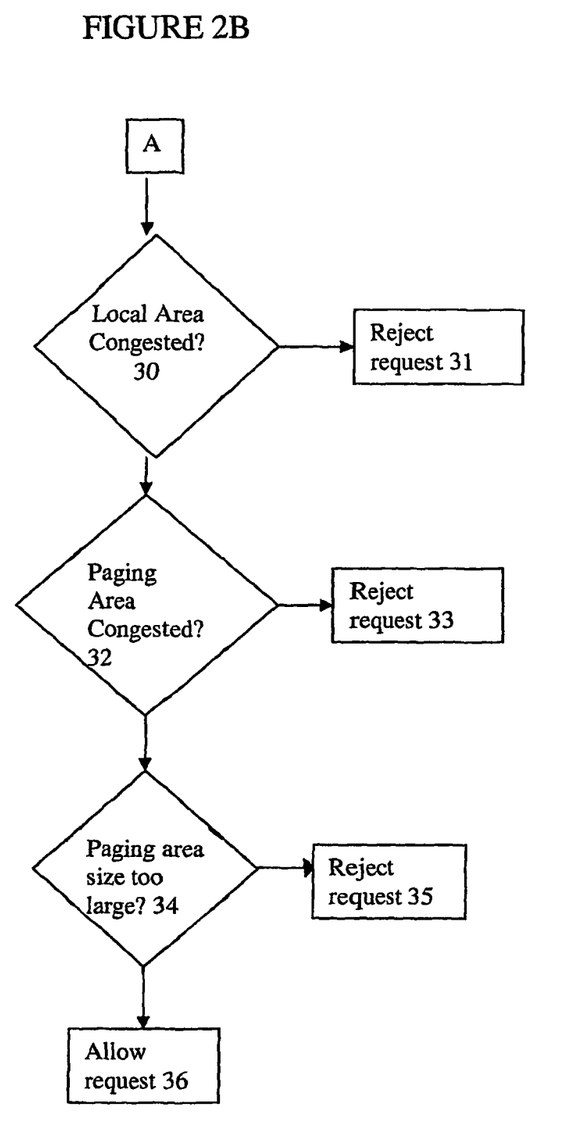

First considering a voice communication request transmitted to an MSC, where the MSC receives such a request, the MSC 2 will make a decision on whether or not to continue with the request for this more demanding service, such as based upon whether the paging area of the intended recipient includes a congested area (e.g. an area covered by the access restrictions) (step 32).

In this regard, for each mobile terminal, the core network 12 will have a record of the terminal's last recorded position and one or more tracking areas/location areas/routing areas, associated with that last location, which will be the paging area for the recipient (terminating) terminal. For a UMTS/

GSM network, the coverage area of the mobile telecommunications network is divided into a plurality of location areas (LAs) (for circuit switched communications) and into a plurality of routing areas (RAs) (for packet switched communications). The equivalent areas in the proposed LTE network are described as tracking areas (TAs). Typically, although not necessarily, a location area/tracking area/routing area is larger than the area of a single cell and within the area covered by a single MSC.

To make the decision whether or not to proceed with the call setup request, MSC 2 will retrieve paging area information for the intended recipient terminal either from its own VLR 14, or from the core network's HLR 10. Once the MSC 2 has the recipient terminal's paging area information, the MSC will make a decision on whether or not to terminate the call by paging the mobile.

Alternatively, or additionally, the MSC 2 may also have information from the core network 12 in regard to the location of high congestion areas. The MSC 2 can therefore also decide to terminate the call establishment if the paging area of the terminating subscriber is part of a high congestion area. For instance, the MSC may decide to terminate the call where the paging area includes congested cells in a restricted access area. In this regard, each cell can have a status associated to it, which the MSC uses in making its decision. The MSC may take into account the access class of the initiating subscriber (which is contained within the communication set up request and/or retrieved from the HLR), the access class of the terminating subscriber (which the MSC may obtain from the HLR, or other suitable database, of the terminating party) and the access restrictions associated with the cells in which the initiating and terminating subscribers are located.

Another basis upon which the MSC 2 may make a decision on whether or not to continue with the request is the size of the paging area of the intended recipient (step 34).

For example, if the paging area is too large and will use up too many signalling resources, then the MSC 2 may decide to terminate the call request (step 35). In this regard a size threshold can be used to determine if the paging area is too large. The threshold will typically be based upon the number of cells in the paging area.

If the paging area is not too large, then the call will be allowed to proceed (step 36), and the communication request forwarded to the next applicable network element.

If the MSC 2 decides that the call establishment will proceed, and MSC 2 controls the required paging area, such as the cell of base station 5, then MSC 2 will transmit the paging request to base station 5. If the paging area belongs to another MSC, such as the cells of base stations 8 and 9, controlled by base station 6, then MSC 2 will relay the call establishment request to the second MSC 6, via the core network 12. This second MSC 6 can then perform similar filtering as the first MSC 2, if required.

In terms of data messages sent to the SGSN, these will be low data rate requests, since the base station has already undertaken a filtering process for high rate requests, and so will simply proceed with sending the request to the core network 12.

According to an alternative embodiment of the invention, rather than the base station performing steps 20 to 31 of FIG. 2A, the base station is configured to transfer all communication requests, and it is a higher hierarchical network element, such as the MSC/SGSN or core network, that performs the "restricted access" mode checks. This embodiment of the invention is useful if it is not possible to provide the base station with access to data relating to the called party (such as their priority level).

According to a still further implementation, where the core network performs the steps 20 to 31 of FIG. 2A, it also performs the steps of FIG. 2B.

Similarly, the core network 12 can perform additional filtering, particularly in regard to information that would be burdensome to provide to each and every MSC/base station in the network.

Filtering at BTS of Terminating Subscriber

In further embodiments a filtering stage may be provided at the BTS which is serving the terminating subscriber and which is currently in a restricted access state. In order for the terminating BTS to filter the communications effectively, it is informed of the access class of the initiating subscriber and/or terminating subscriber and/or an indication of service type. Ideally, this is attached to the communication set up request by one of the network components through which the set up request has passed, for example, the initiating subscriber's MSC.

This filtering stage may be performed by the one or more base stations (5 or 8, 9) once they receive the communicating setup request. In a preferred embodiment the BTS will compare the access class of both the initiating and terminating subscribers with the access restrictions that it is currently enforcing on its cell. If either of access classes is currently permitted by the cell then the BTS will proceed with the paging of the terminating terminal. Alternatively, the cell may automatically allow the communication if either of the access classes is associated with emergency or priority services, for example classes 10-15.

For example, a policeman having access class 14 is attempting to set up a call with a subscriber in congested cell who has access class 7. The cell serving of the called subscriber is in a restricted access state and only allows communications for subscribers having access classes 1, 5, 10, 11, 12, 13, 14 and 15. Since one of the parties to the communication has an access class which is permitted by the cell, i.e. the policeman's class 14, the cell allows the call to be terminated despite the fact that the terminating subscriber has an access code which is restricted by the cell. In the embodiment in which the cell will allow the communication if either party has an access class associated with the emergency services (classes 10-15), the communication would, again, be connected since the policeman has class 14.

However, in the same restricted cell, if the initiating party had access class 4 and he was trying to contact the same subscriber, the call would not be connected since neither class 4 nor 7 are permitted by the terminating cell.

In an alternative embodiment, the terminating BTS or MSC might identify the access class of the initiating subscriber when it receives the set up request and, if it is an emergency, or otherwise unrestricted, class will automatically allocate resource to the communication.

Again, as discussed above, the terminating BTS or MSC may also take account of the size of the data transfer and resource allocation before deciding to terminate a call. Therefore, even if the access classes of both parties are restricted, if the size of the data is sufficiently small, for example an SMS, the cell may allow the communication to be terminated.

The filtering of the paging messages at the Terminating BTS has the advantage that the BTS may allow some paging of other lower priority groups when load of the traffic capacity on the cell falls below a predefined level, allowing the traffic load off the cell to be better managed while carefully controlling the signalling load.

Therefore from these embodiments it can be seen that the system described herein can still attain the benefits of Access Class Barring, but is also able to provide greater flexibility in regard to how other communications are allowed or disallowed. Access Class Barring has limited functionality, since priority can only be given on a per base station or subscriber basis. The system described herein, however, allows network access to be controlled dependent on the network situation and priority needed.

In particular, the system described herein is able to allow all users to transmit small bandwidth messages, such as SMS, rather than only some UEs being able to perform more demanding services with higher bandwidth requirements.

Embodiments of the invention also allow the network components to take into account the access classes of all subscribers involved in the communication rather than just the class of the subscriber in the restricted area. Therefore, even though a subscriber is in a cell in which his access class is restricted, he would be able to initiate or terminate communications involving a subscriber having an unrestricted access class.

Further advantages provided by embodiments of the present invention are that decisions regarding the communication are made on a communication by communication basis. Thus, rather than blocking all communications to and from a particular class of subscriber, other parties to the communication, the type of communication and the size of the communication can all be taken into account. This enables better usage of the data capacity of the cells since rather than having to reserve a particular capacity for emergency or priority subscribers this capacity can be utilised since communications are filtered individually.

In addition, the ordering of the filtering steps, as described in relation to FIGS. 2A and 2B is only an example embodiment of the invention, and other alternative rule orders are possible.

The embodiments described are to be considered as illustrations of the system described herein and not be limited thereto, as variations are possible. For example, the network can have a number of different levels of operating procedures for each of the network elements, which can be implemented depending on the operational situation. In other words, the network elements do not need to be all operating according to the same procedures—different procedures can be applied to each base station and MSC as required. For example, different capacity level thresholds can be applied to each base station.

Further, the filtering functionality need not be performed by each and every base station and MSC, as described above. Instead, the MSCs, for instance, may be excluded, so that only the base stations and the core network perform the filtering functionality. Alternatively, the MSC may perform the filtering for each of its base stations, so that little or no filtering is performed in the base station. The network may control the filtering functionality, ideally at the earliest point possible, so that the exact location of where the filtering is performed depends on the information available to each element.

Although the embodiments described have generally been in relation to mobile-to-mobile communications, the embodiments of the invention equally apply to landline originating or landline terminating calls in relation to a single mobile terminal. The filtering functionality in this regard will only apply to the base station and MSC controlling the restricted cell where the mobile terminal is located, and possibly the core network.

It is also to be appreciated that the functionality just described is one example of a network in which the embodiments of the invention may be implemented. For example, the functionality just described may also apply to the proposed LTE mobile telecommunications network, with its eNode Bs performing the functionality of the base stations and the MME/UPE performing the functionality of the MSCs/VLRs.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of restricting the establishment of communications in a mobile telecommunications network, comprising:
   at least one network element that, upon receiving a message, the message being at least one of: a communication setup message or a paging message, decides whether to transmit the message based upon a type of service requested, wherein the message is transmitted when the message is a request for a low data rate service, wherein the at least one network element further considers a priority level of an intended recipient, and wherein the at least one network element further performs at least one of the following:
   (i) considers a priority level of a first mobile terminal initiating the message, wherein the intended recipient is a second mobile terminal, and wherein the at least one network element transmits the message where the message is received from and for a low priority mobile terminal and the at least one network element has fallen below a cell utilisation threshold, or
   (ii) transmits the message where the intended recipient of the message has a low priority level and a paging area associated with the intended recipient does not include an area of congestion.

2. The method of claim 1, wherein the at least one network element further considers at least one of the following when deciding whether to transmit the message:
   (i) a current load capacity of a base station; or
   (ii) where the intended recipient of the message is a third mobile terminal, a paging area characteristic of a paging area associated with the third mobile terminal device.

3. The method of claim 1, wherein the at least one network element will transmit the message where the type of service requested is a Short Message Service (SMS).

4. The method of claim 1, wherein, when the type of service requested is a voice communication, the at least one network element further:
   considers a current load capacity of the base station, and
   transmits the message where the current load capacity is below a predetermined load threshold.

5. The method of claim 4, wherein the message is a communication setup message, and the base station is the base station that receives the communication setup message directly from a mobile terminal initiating the communication setup message.

6. The method of claim 4, wherein the message is a paging message, and the base station is the base station broadcasting the paging message in its cell.

7. The method of claim 5, wherein the at least one network element includes the base station.

8. The method of claim 5, wherein the at least one network element includes a Mobile Switching Centre (MSC) controlling the base station.

9. The method of claim 1, wherein the at least one network element transmits the message where the priority level of the intended recipient is high priority.

10. The method of claim 1, wherein the message originates from a landline terminal, and the message is intended for a mobile terminal.

11. The method of claim 1, wherein the message, which is a communication setup message, is transmitted by a mobile terminal and is intended to establish a communication with a landline terminal.

12. The method of claim 1, wherein the at least one network element further:
considers the paging area characteristic, the paging area characteristic being a paging area size; and
terminates the message where the paging area size exceeds a paging area limit.

13. The method of claim 1, wherein the at least one network element further:
considers the paging area characteristic, the paging area characteristic being a paging area congestion status; and
terminates the message where the paging area includes a congested cell according to the paging area congestion status.

14. A system for restricting the establishment of communications in a mobile telecommunications network, comprising:
at least one network element that, upon receiving a message, the message being at least one of: a communication setup message or a paging message, decides whether to transmit the message based upon a type of service requested, wherein the message is transmitted where the message is a request for a low data rate service, wherein the at least one network element further considers a priority level of an intended recipient, and wherein the at least one network element further performs at least one of the following:
(i) considers a priority level of a first mobile terminal initiating the message, wherein the intended recipient is a second mobile terminal, and wherein the at least one network element transmits the message where the message is received from and for a low priority mobile terminal and the at least one network element has fallen below a cell utilisation threshold, or
(ii) transmits the message where the intended recipient of the message has a low priority level and a paging area associated with the intended recipient does not include an area of congestion.

15. In a mobile telecommunication network including a plurality of mobile terminals having a priority indication, a network element configured for use in restricting the establishment of communications with the plurality of mobile terminals, the network element including:
an access mode component configured to operate in a restricted access mode upon receiving an instruction to do so;
a filtering component configured to use a rule set to determine whether to action any communication request received when operating in the restricted mode, wherein the restricted mode rule set actions all low data rate requests to allow transmission of the low data rate requests, wherein the filtering component further considers a priority level of an intended recipient, and wherein the filtering component further performs at least one of the following:
(i) considers a priority level of a first mobile terminal initiating the message, wherein the intended recipient is a second mobile terminal and wherein the filtering component actions the message where the message is received from and for a low priority mobile terminal and the at least one network element has fallen below a cell utilisation threshold, or
(ii) actions the message where the intended recipients a low priority level and a paging area associated with the intended recipient does not include an area of congestion.

16. The network element as claimed in claim 15, wherein the cell utilisation threshold is a capacity threshold for low priority users.

17. The network element of claim 15, wherein the rule set that the filtering component is configured to use also actions a message where the intended recipient is a high priority user.

18. The network element of claim 15, wherein the restricted mode rule set further includes a rule to action all communication requests received from or for high priority users.

19. The network element of claim 15, wherein the network element is a base station or a Mobile Switching Centre (MSC).

* * * * *